(12) United States Patent
Wang (10) Patent No.: US 7,075,729 B2
(45) Date of Patent: Jul. 11, 2006

(54) ZOOMING LENS

(75) Inventor: Kuo-Chuan Wang, Miao-Li (TW)

(73) Assignee: Coretronic Corporation, Miao-Li (TW)

( * ) Notice: Subject to any disclaimer, the term of this patent is extended or adjusted under 35 U.S.C. 154(b) by 52 days.

(21) Appl. No.: 10/905,357

(22) Filed: Dec. 29, 2004

(65) Prior Publication Data

US 2006/0098299 A1    May 11, 2006

(30) Foreign Application Priority Data

Oct. 28, 2004    (TW)    ............... 93132693 A (51) Int. Cl.
*G02B 15/14*    (2006.01)
(52) U.S. Cl. ............... 359/681; 359/680; 359/691
(58) Field of Classification Search ............. 359/680, 359/681, 682, 683, 691
See application file for complete search history.

(56) References Cited

U.S. PATENT DOCUMENTS 5,936,780 A *    8/1999    Chuang et al. ............. 359/691

* cited by examiner

*Primary Examiner*—David N. Spector
(74) *Attorney, Agent, or Firm*—Jiang Chyun IP Office (57) ABSTRACT

A zooming lens is suitable for projecting images produced by a display device onto a screen. The zooming lens includes a first set of lenses and a second set of lenses, wherein the second set of lenses is disposed in the optical path between the first set of lenses and the display device. The first set of lenses includes first lens, second lens, third lens, and fourth lens sequentially, and the fourth lens is adjacent to the second set of lenses. The second set of lenses includes fifth lens, sixth lens, seventh lens, and composite lens sequentially, and the composite lens is adjacent to a side of the display device. The optical focusing of the lenses, from the first one through the seventh and to the composite lens, are positive, negative, negative, positive, positive, negative, positive value and positive, respectively. The composite lens includes two optical lenses.

14 Claims, 10 Drawing Sheets

ZOOMING LENS

CROSS-REFERENCE TO RELATED APPLICATION

This application claims the priority benefit of Taiwan application serial no. 93132693, filed Oct. 28, 2004.

BACKGROUND OF THE INVENTION

1. Field of Invention

The present invention relates to a projection lens, and more particularly to a zooming lens with low cost.

2. Description of the Prior Art

Recently, bulky Cathode Ray Tube (CRT) projectors have been gradually replaced by Liquid Crystal Display (LCD) or Digital Light Processing (DLP) projectors. An advantage of LCD or DLP projectors is the compact size and portability. Another advantage is that they can be directly hooked up with digital appliances to display the projected images. With such advantages, the LCD and DLP projectors are taking broader market. To enhance the competitiveness in the market, the manufactures are striving to reduce the production cost and retail price.

Generally, a projection device produces images by means of an optical engine, where an image is generated, and then by a zooming lens, whereby the images are projected onto a screen. Consequently, the cost of a projection device mainly depends on the optical engine and zooming lens.

Figure 1A:
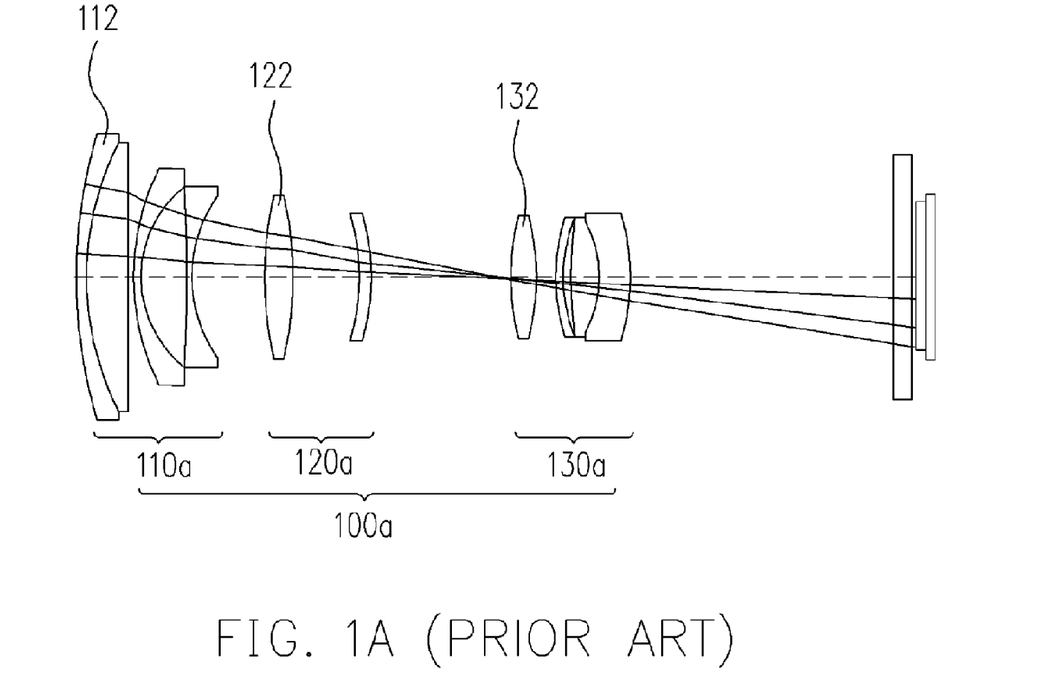
FIGS. 1A and 1B are schematic illustrations showing a conventional zooming lens.
Figure 1B:
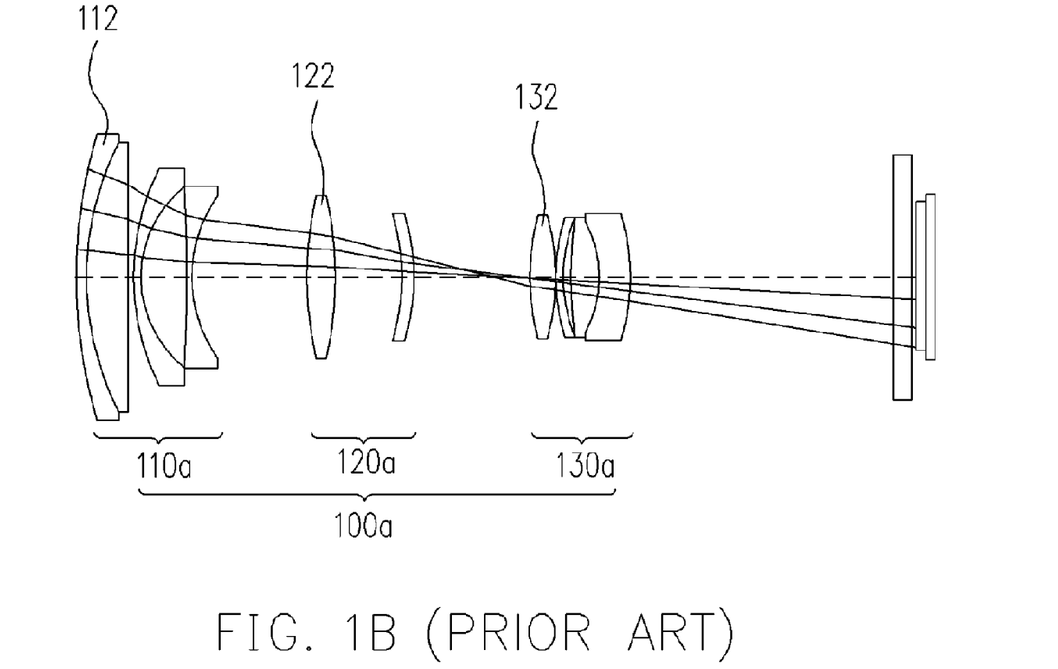

FIG. 1A and FIG. 1B schematically illustrate the structure of a conventional zooming lens. Referring to FIGS. 1A and 1B, a conventional zooming lens 100a comprises three sets of lenses, 110a, 120a and 130a respectively composed of four lenses 112, two lenses 122 and four lenses 132.

As above-described, as the zooming lens 100a zooms in from its tele-end (as shown in FIG. 1A) to wide-end (as shown in FIG. 1B) by adjusting the magnification, or conversely, zoom out from its wide-end to tele-end, these three sets of lenses 110a, 120a and 130a have to move simultaneously for magnified or reduced effect. To achieve such purpose, an interlock mechanism among the set of lenses 110a, 120a and 130a must be employed in the zooming lens 100a. In turn, the production cost is increased with the complexity of the mechanism structure.

Figure 2A:
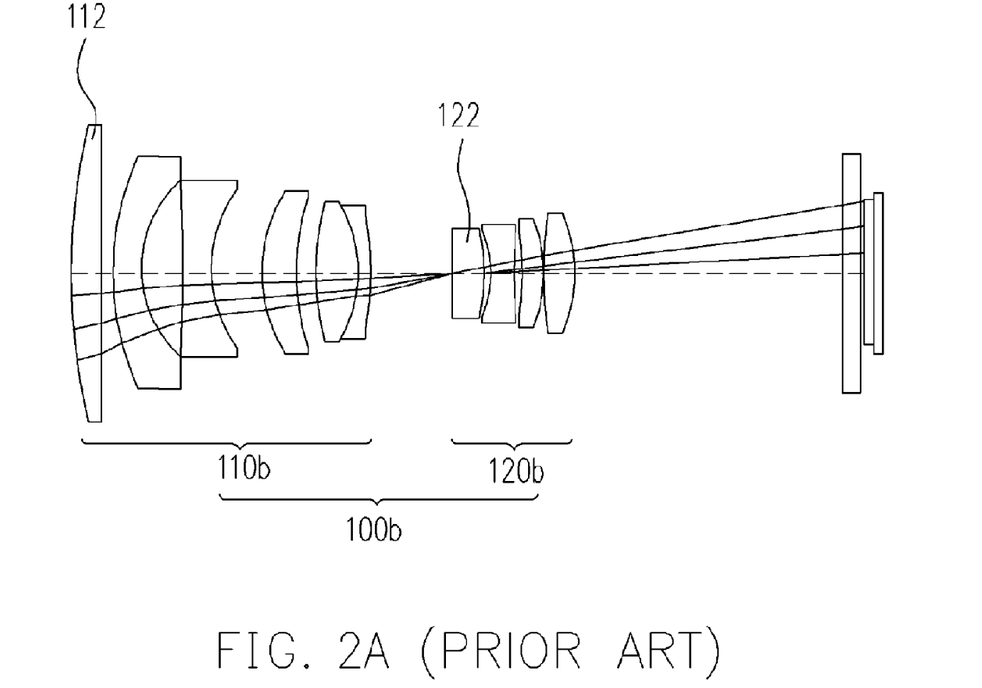
FIGS. 2A and 2B are schematic illustrations showing another conventional zooming lens.
Figure 2B:
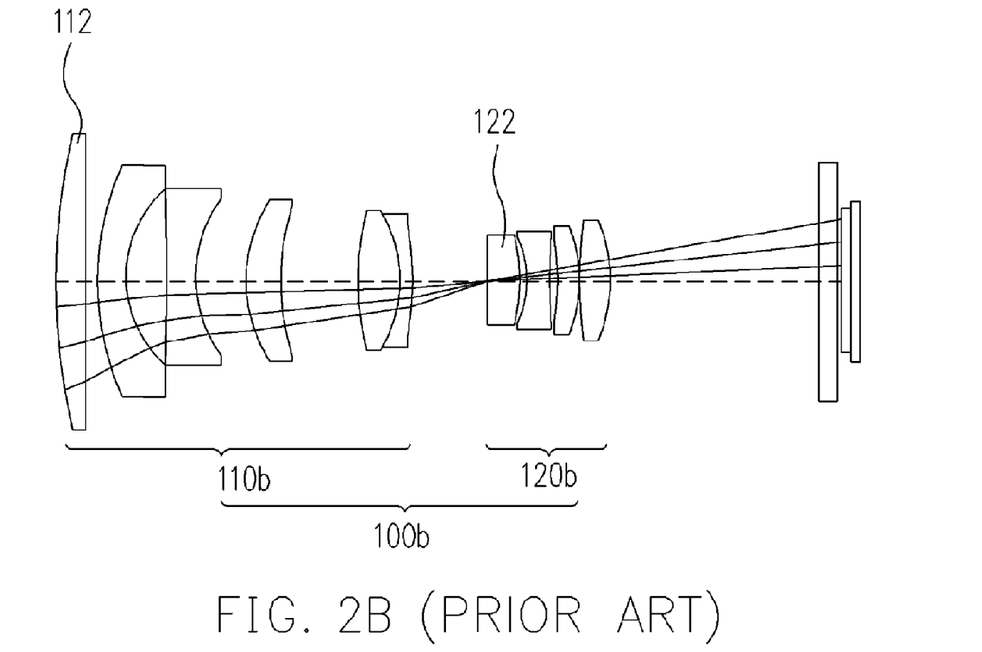

FIG. 2A and FIG. 2B schematically illustrate another conventional zooming lens. Referring to FIGS. 2A and 2B, the conventional zooming lens 100b mainly comprises two sets of lenses, 110b and 120b, which are respectively composed of six lenses 112 and four lenses 122.

As described above, when the magnification of the zooming lens 100b changes from its tele-end, as shown in FIG. 2A, to the wide-end, as shown in FIG. 2B, or changes from its wide-end to the tele-end, these two sets of lenses 110b and 120b move simultaneously for achieving the effect of magnifying or reducing the magnification. Since this zooming lens 100b only need to cause the two sets of lenses to simultaneously move together when changing the magnification, therefore it has a simpler mechanical design, resulting in lower fabrication cost.

Since the lenses are manually assembled, the addition one of the lens causes the increase of fabrication cost for the lens itself, but also the increase of number of elements and assembling time in manpower. As a result, although the zooming lens 100b is cheaper than the zooming lens 100a, it still has a higher production cost because of the zooming lens 100b still needs ten pieces of lenses, causing the still increase of fabrication cost.

SUMMARY OF THE INVENTION

Accordingly, it is an object of the present invention to provide a zooming lens, comprising nine lenses with various focusing values, which is capable of reducing the production cost while maintaining the image quality.

It is another object of the present invention to provide a zooming lens, comprising two sets of lenses with different optical focusing values, which is capable of reducing the production cost while maintaining the image quality.

It is still another object of the present invention to provide a zooming lens wherein the corresponding positions and the amount of lenses in two sets of lenses are designed based on a symmetry principle to effectively reduce the optical aberrations.

According to the above and other objects of the present invention, a zooming lens is provided, which is suitable for projecting images produced by a display device onto a screen. The present zooming lens comprises a first set of lenses and a second set of lenses, wherein the second set is located in the optical path between the first set of lenses and the display device. The first set of lenses comprises a first lens, a second lens, a third lens and a fourth lens sequentially, wherein the fourth lens is adjacent to the second set of lenses. The optical focusing values of the first lens, the second lens, the third lens and the fourth lens are positive value, negative value, negative value and positive value, respectively. In addition, the second set of lenses comprises a fifth lens, a sixth lens, a seventh lens and a composite lens sequentially, wherein the composite lens is adjacent to a side of the display device. The optical focusing values of fifth lens, sixth lens, seventh lens and composite lens takes a positive value, a negative value, a positive value and a positive value, respectively. The composite lens comprises two lenses.

In comparison with the conventional zooming lens, which uses 10 pieces of lenses, the zooming lens of the present invention employs only nine pieces of lenses, without downgrading the image quality, so the present invention can reduce production cost.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3A:
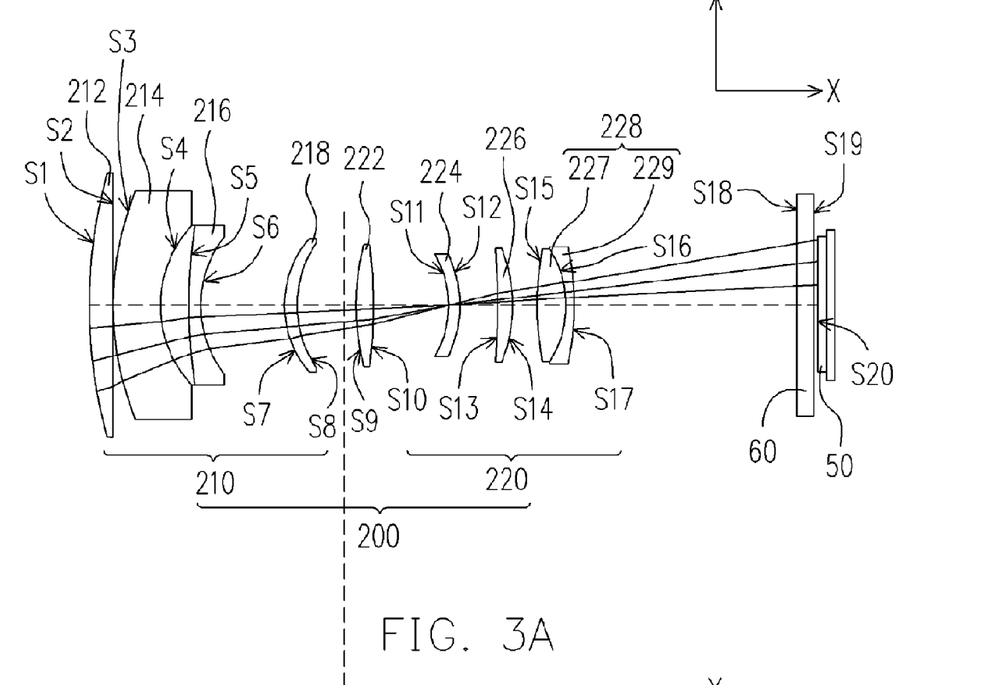
FIGS. 3A and 3B are schematic illustrations showing a zooming lens according to an embodiment of the present invention.
Figure 3B:
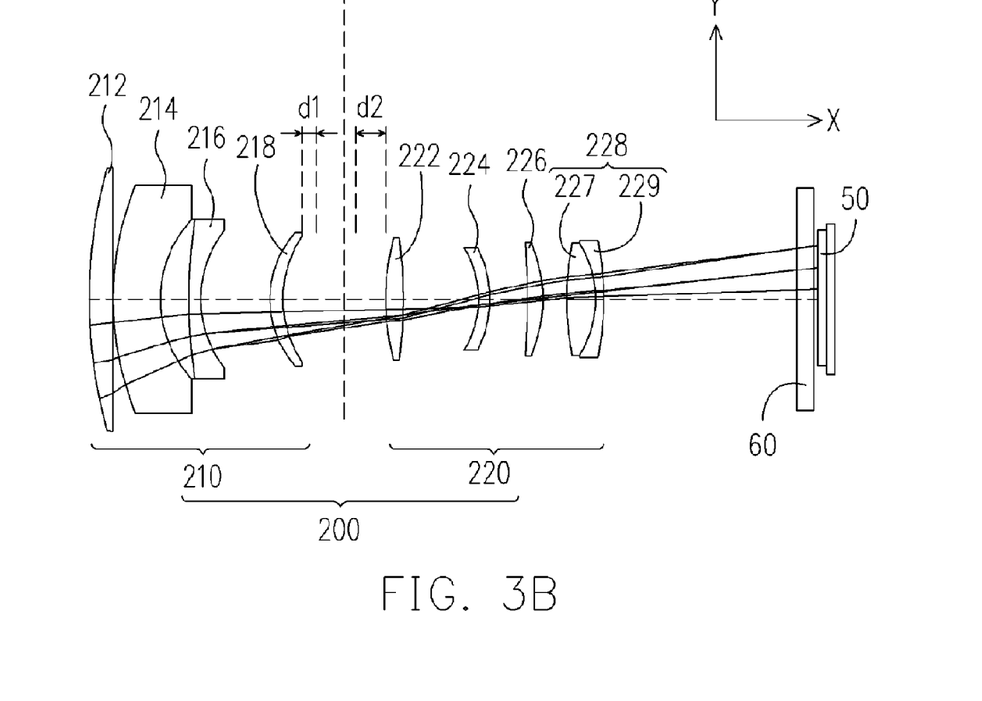

FIG. 3A and FIG. 3B are schematic illustrations showing a zooming lens according to an embodiment of the present invention. Referring to FIGS. 3A and 3B, the zooming lens 200 is adapted to project images produced by the display device 50 onto a screen (not shown). The present zooming lens 200 comprises a first set of lenses 210 and a second set of lenses 220, wherein the second set of lenses 220 is located in the optical path between the first set of lenses 210 and the display device 50. The first set of lenses 210 comprises a first lens 212, a second lens 214, a third lens 216 and a fourth lens 218 sequentially, wherein the fourth lens is adjacent to the second set of lenses 220. The optical focusing values of the first lens 212, the second lens 214, the third lens 216 and the fourth lens 218 are, for example, positive value, negative value, negative value and positive value, respectively. In addition, the second set of lenses 220 comprises a fifth lens 222, a sixth lens 224, a seventh lens 226 and a composite lens 228 sequentially, wherein the composite lens is at a side of the display device 50. The optical focusing values of fifth lens 222, sixth lens 224, seventh lens 226 and composite lens 228 are, for example, positive value, negative value, positive value and positive value, respectively. The composite lens 228 comprises, for example, two lenses 227 and 229.

It is to be noted that in FIGS. 3A and 3B, a protective lens 80 is, for example, disposed in front of display device 50.

In the aforementioned zooming lens 200, the first set of lenses 210 and the second set of lenses 220 are, for example, adapted to move along the optical path, for example along the X axis, toward or away from the display device 50 for adjusting zooming magnification. As the magnification increases from minimum to maximum, the zooming lens 200 shifts from its tele-end (shown in FIG. 3A) to the wide-end (shown in FIG. 3B). In other words, the first set of lenses 210 shifts a distance of d1 away from the display device 50 while the second set of lenses 220 shifts a distance of d2 toward the display device 50, wherein |d1−d2| is, for example, less than or equal to 1.7 mm. On the other hand, when the magnification reduces from maximum to minimum, the zooming lens 200 shifts from its wide-end to the tele-end; namely, the first set of lenses 210 shifts a distance of d1 toward the display component 50 while the second set of lenses 220 shifts a distance of d2 away from display device 50.

In zooming lens 200 of the present embodiment, the position of the formed image can be further adjusted by means of shifting the first set of lenses 210 along X axis away from or toward the display device 50 to project sharper images by the zoom lens 200. In another words, the first set of lenses 210 not only has the zooming function, but also has the imaging compensation function, to avoid aberration and shifting of formed images.

In an embodiment of the present invention, the first set of lenses 210 has, for example, a negative diopter $\psi 1$, and the second set of lenses 220 has, for example, a positive diopter $\psi 2$. Wherein, the relationship between the negative optical diopter $\psi 1$ and the positive optical diopter $\psi 2$ can be given by, for example,: $1.1 \leq |\psi 1/\psi 2| \leq 1.5$. When $|\psi 1/\psi 2|$ is less than 1.1, the required shifting distance increases under a same zoom ratio. Therefore, the adjustable magnification of zooming lens 200 can be reduced without changing the size of a zooming lens. On the other hand, to maintain the magnifying power, the size of the zooming lens 200 must be increased, and the compact requirement cannot be met.

Besides, as $|\psi 1/\psi 2|$ is larger than 1.5, an accumulative aberration by the first set of lenses is too large, so that the second set of lenses 220 is incapable of sufficiently reducing the accumulative aberration. Thus in the embodiment, to enhance the quality of zooming lens 200, the negative diopter $\psi 1$ and the positive diopter $\psi 2$ preferably meet the following condition: $1.1 \leq |\psi 1/\psi 2| \leq 1.5$, so as to improve the quality of the zooming lens 200.

It should be noted that in this embodiment, the lens number N1 for the first set of lenses 210 is 4 and the lens number N2 of the second set of lenses 220 is 5, so the condition of $|N1-N2| \leq 2$ is met. Therefore, in the embodiment, the symmetry principle can be employed to improve aberration in the zooming lens 200. Nevertheless, if $|N1-N2|$ is larger than 2, then the symmetry structure is destroyed. In this situation, the lens number must be increased to keep the same imaging quality.

The embodiment of zooming lens 200 is provided as the example, where the optical diopters and the number of lens pieces in the zooming lens 200 meet both conditions of $1.1 \leq |\psi 1/\psi 2| \leq 1.5$ and $|N1-N2| \leq 2$. However, the present invention is not limited to the data listed in Table 1 and Table 2. It should be known to those ordinary skilled in the art that various modifications and variations can be made to the structure of the present invention without departing from the scope or spirit of the invention.

TABLE 1

Effective focus = 22.3 mm–26.7 mm
Focus-to-diameter ratio = 2.75–3

| Number of surfaces | Curvature radius (mm) | Thickness (mm) | Index of refraction | Dispersion value |
|---|---|---|---|---|
| S1 | 81.787 | 4.14 | 1.56 | 60.7 |
| S2 | 700.757 | 0.143 | | |
| S3 | 55.574 | 8.204 | 1.59 | 61.1 |
| S4 | 20.466 | 4.914 | | |
| S5 | 94.482 | 2.394 | 1.71 | 53.9 |
| S6 | 20.247 | 15.017 | | |
| S7 | 19.107 | 2.033 | 1.80 | 39.6 |
| S8 | 19.996 | A | | |
| S9 | 40.252 | 3.065 | 1.60 | 65.4 |
| S10 | −88.087 | 13.237 | | |
| S11 | −15.994 | 1.978 | 1.60 | 38 |
| S12 | −21.996 | 6.932 | | |
| S13 | −112.917 | 2.553 | 1.64 | 60.1 |
| S14 | −25.513 | 4.615 | | |
| S15 | 75.213 | 4.879 | 1.54 | 47.2 |
| S16 | −18.746 | 1.139 | 1.81 | 25.4 |
| S17 | −63.977 | B | | |
| S18 | infinity | 3 | 1.49 | 70.4 |
| S19 | Infinity | 0.483 | | |
| S20 | infinity | | | |

TABLE 2

| | Focus (mm) | A | B |
|---|---|---|---|
| Wide-end | 22.3 | 18.413 | 34.728 |
| Tele-end | 26.7 | 10.287 | 39.622 |

In Table 1, S1 and S2 are two surfaces of the first lens 212, S3 and S4 are two surfaces of the second lens 214, S5 and S6 are two surfaces of the third lens 216, S7 and S8 are two surfaces of the fourth lens 218, S9 and S10 are two surfaces of the fifth lens 222, S11 and S12 are two surfaces of the sixth lens 224, S13 and S14 are two surfaces of the seventh lens 226, S15 is the surface of lens 217 away from the display device 50, S16 is the surface of lens 217 which connects with the lens 219, S17 is the surface of lens 219 adjacent to display device 50, S18 and S19 are two surfaces of the protective lens 60 and S20 is a surface of the display device 50. Regarding the curvature radius of each surface, thickness, index of refraction and dispersion value, please refer to Table 1 and Table 2.

Figure 4A:
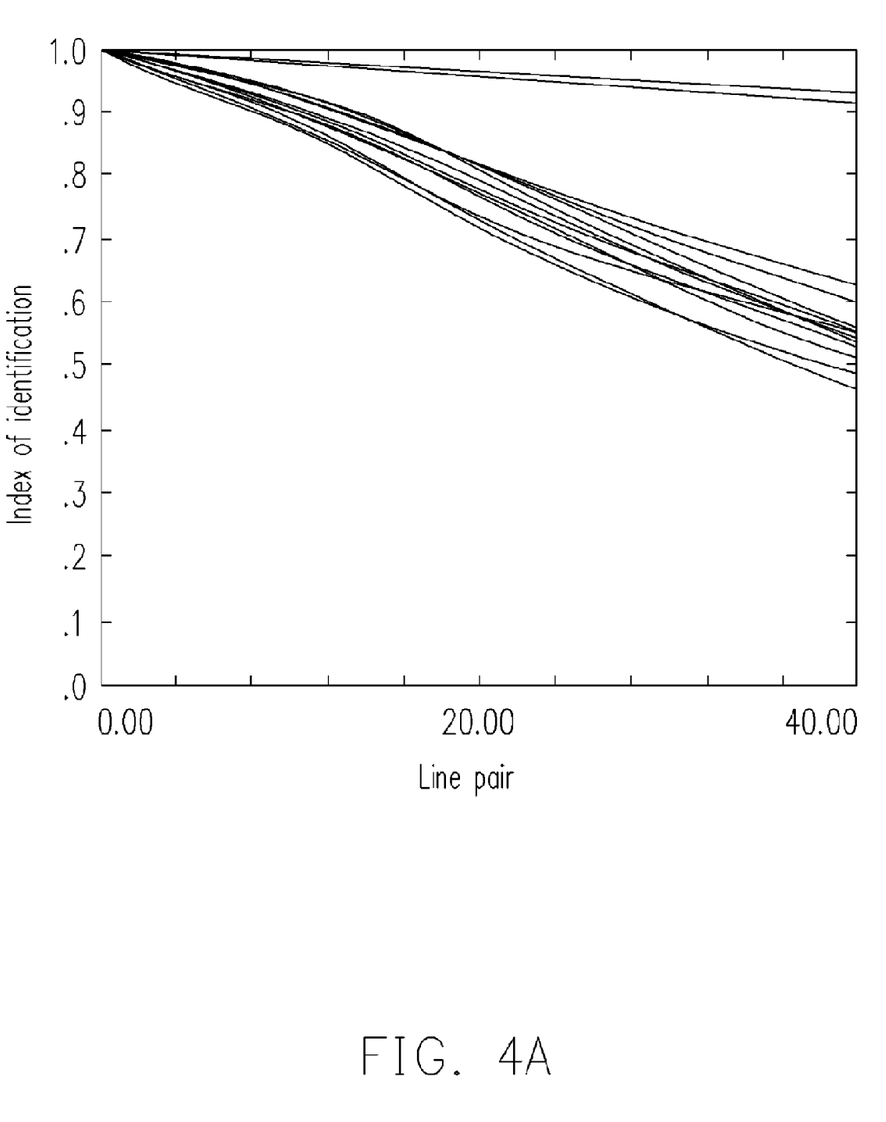
FIGS. 4A and 4B are diagrams, schematically showing the relationship between index of identification and number of line pair for the projected images at tele-end and wide-end respectively.
Figure 4B:
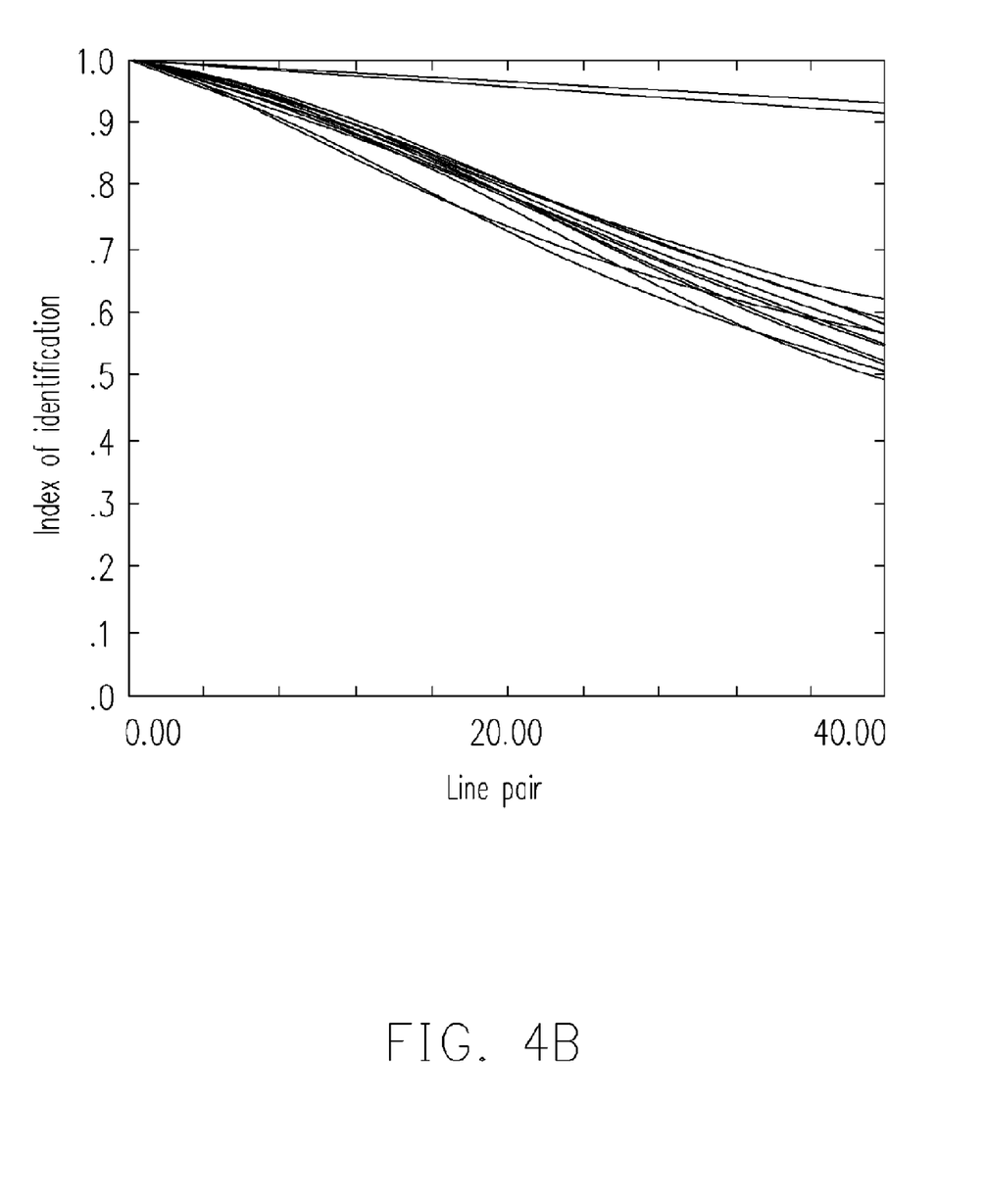

FIGS. 4A and 4B are diagrams showing the relationship between index of identification and number of line pair for the projected images at tele-end and wide-end respectively. Referring to FIGS. 4A and 4B, taking an image with resolution of 800×600 as an example, where 40 line pairs within 1 mm space can be displayed. When the line pair number is 40, the required index of identification must be larger than 0.5 to meet the requirement of the specification, or to be acceptable in general. In fact, at either the tele-end or wide-end using the zooming lens of present embodiment, the index of identification for the projected image with 40 line pairs is still larger than 0.5.

Figure 5A:
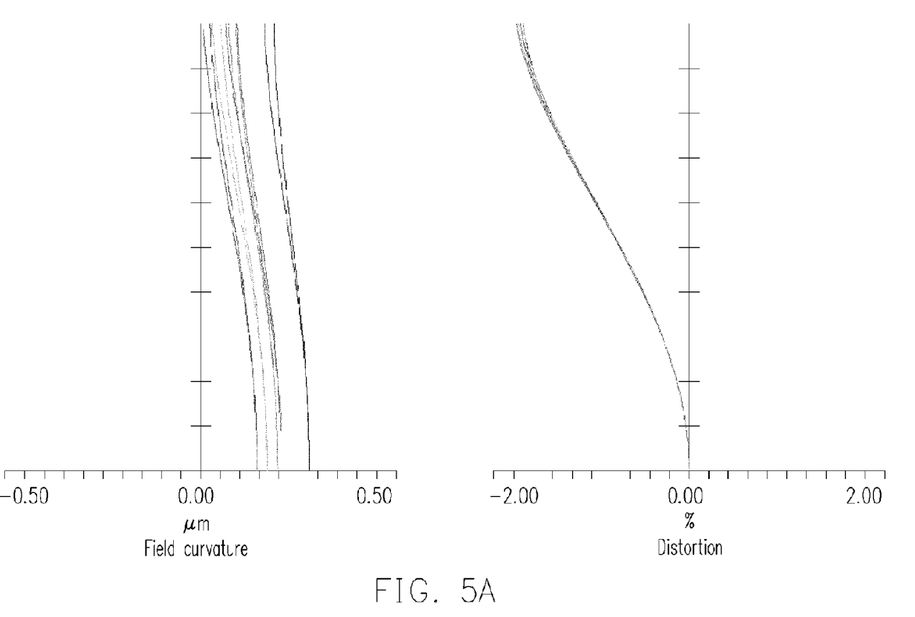
FIGS. 5A and 5B are diagrams, schematically showing the relationship between field curvature and distortion for the projected images at tele-end and wide-end respectively.
Figure 5B:
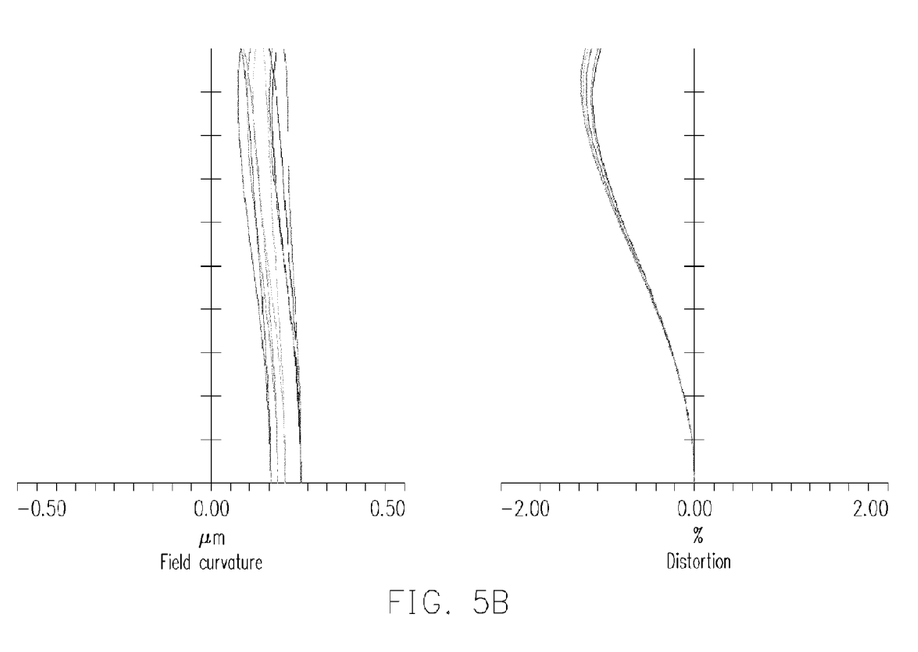

FIGS. 5A and 5B are diagrams showing the relationship between field curvature and distortion for the projected images at tele-end and wide-end respectively. As shown in FIGS. 5A and 5B, either at the tele-end or at the wide-end, both of field curvature and distortion are within the required standard for the projected image using the zooming lens of the present embodiment.

Figure 6A:
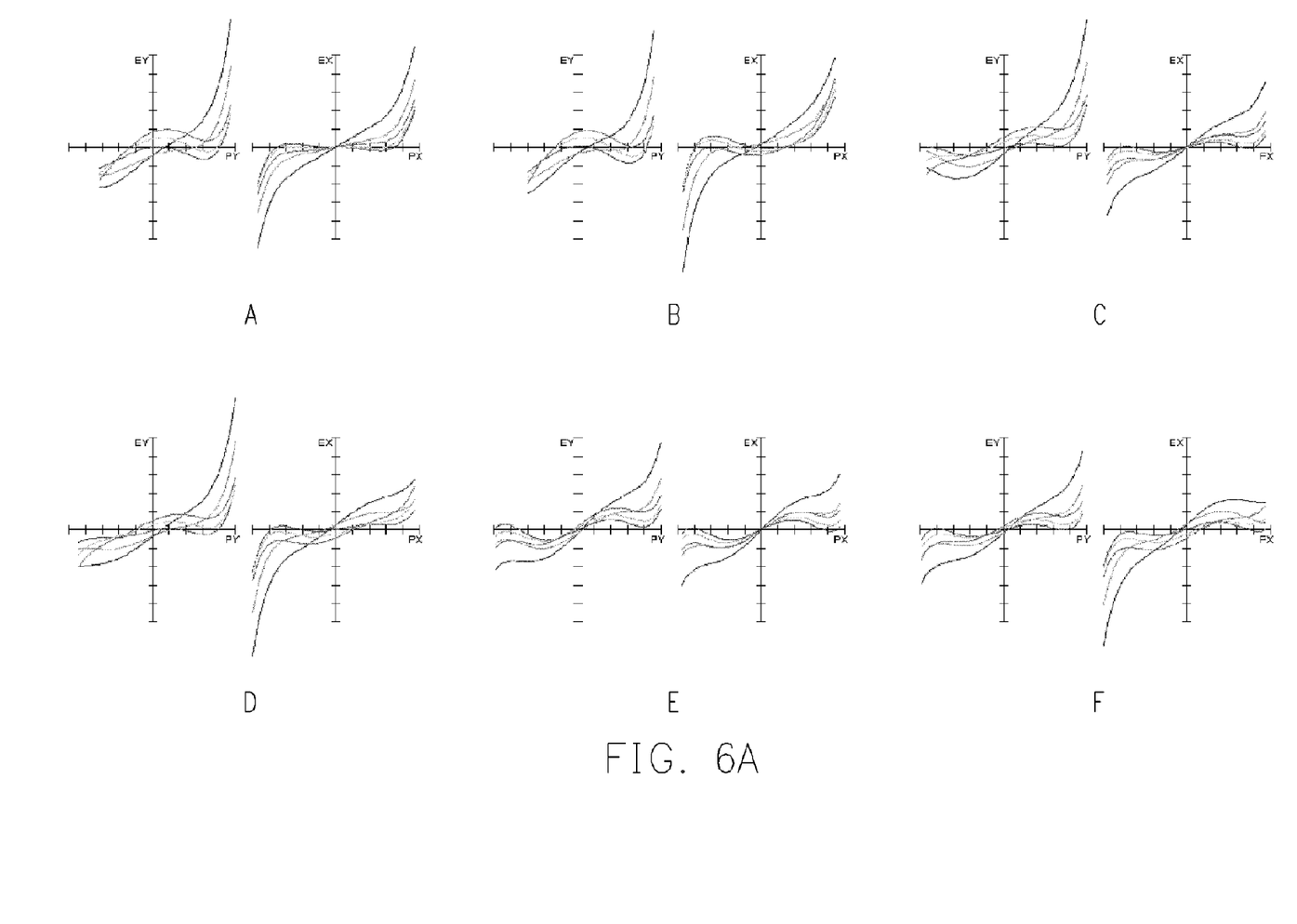
FIGS. 6A and 6B are diagrams, schematically showing transverse ray sector plots for the projected images at tele-end and wide-end respectively.
Figure 6B:
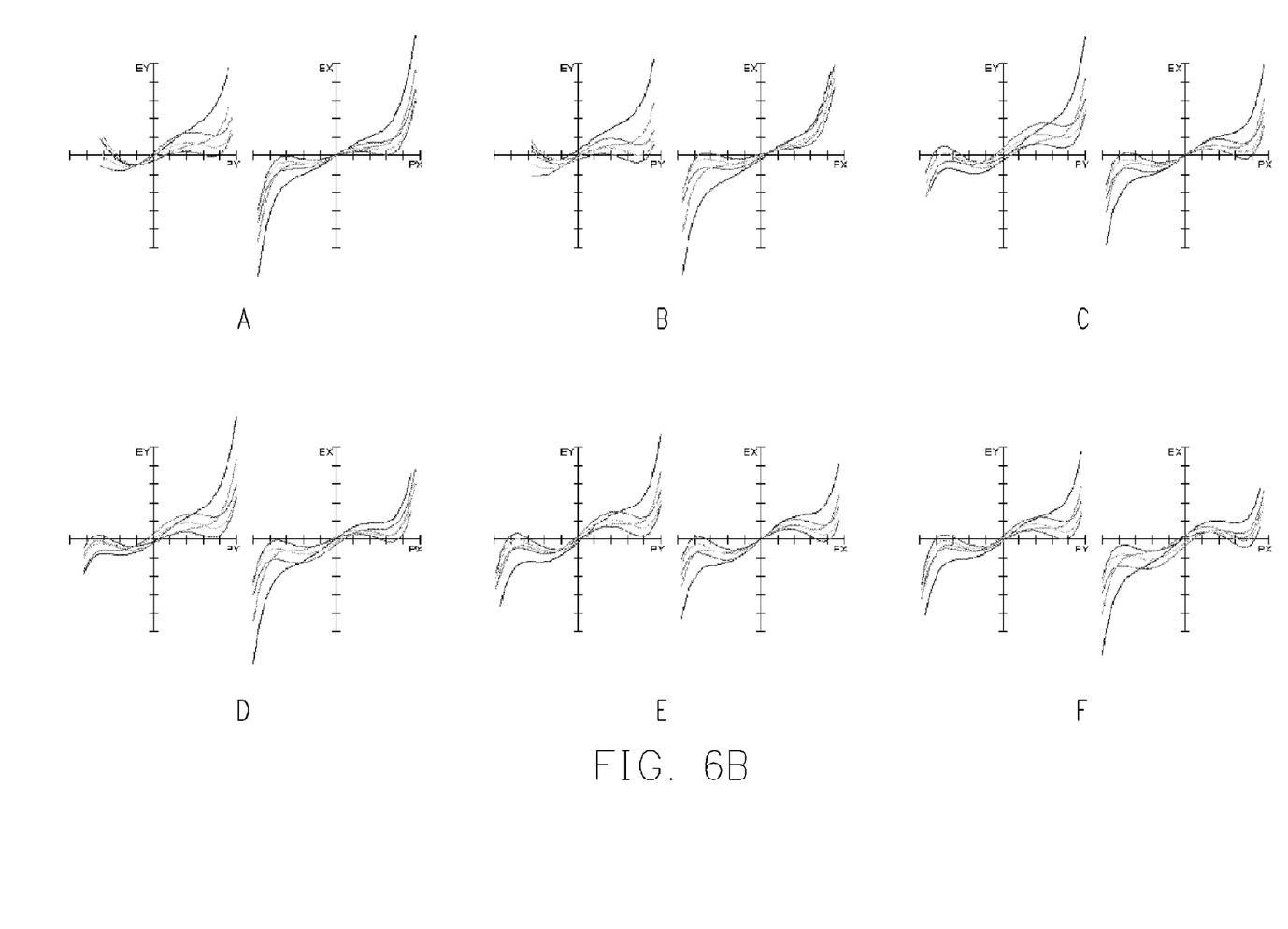
Figure 7:
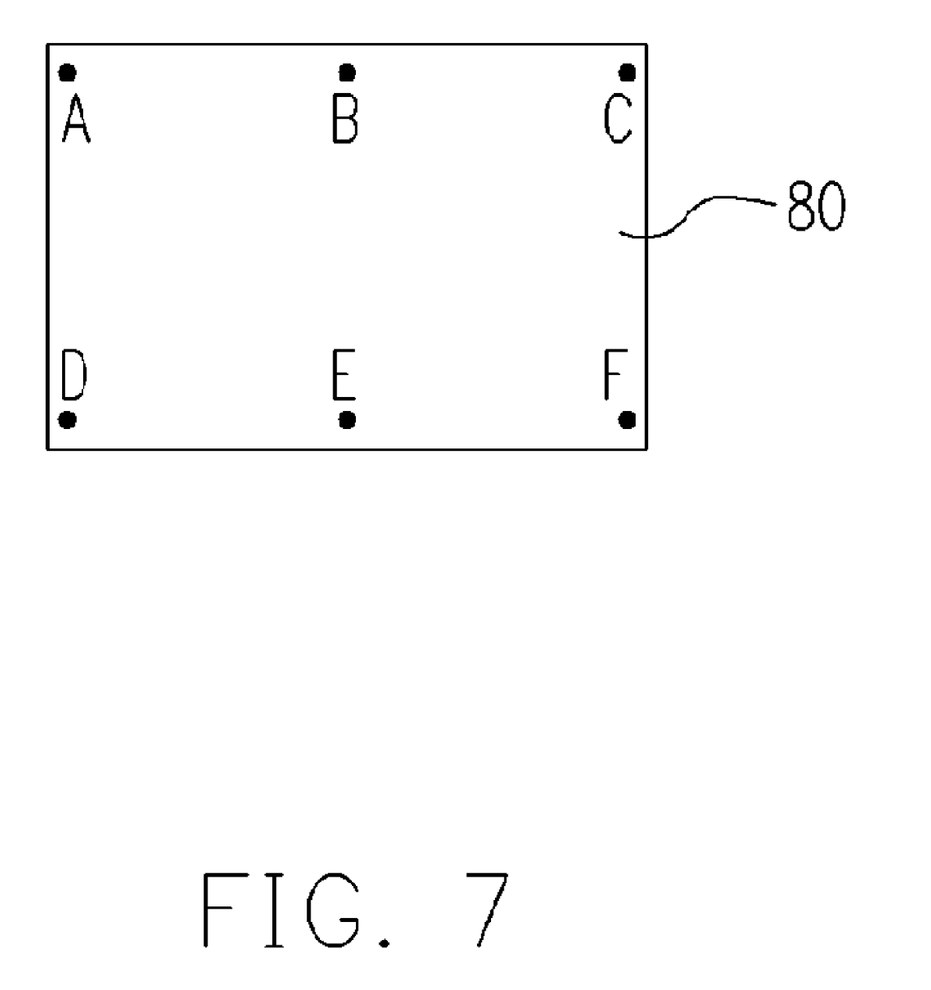
FIG. 7 is a schematic diagram of a formed image.

FIGS. 6A and 6B are diagrams showing transverse ray sector plots for the projected images at the tele-end and the wide-end, respectively, and FIG. 7 is a schematic diagram of a formed image. Please refer to FIGS. 6A, 6B and 7. The sub-figure A, B, C, D, E, F of FIG. 6A and 6B shows the transverse ray sector plots corresponding to spot A, B, C, D, E, F of image 80, respectively. It is known that all transverse ray sector plots are within the standard by using the zooming lens of present embodiment either at tele-end or at wide-end.

Therefore, it can be concluded from FIGS. 4A, 4B, 5A, 5B, 6A and 6B that using the zooming lens of the present invention, the production cost will be effectively reduced while the image quality stays unchanged.

Accordingly, the present invention has at least the following advantages:

1. Only nine pieces of lenses are needed in the zooming lens of present invention, which can not only save the cost of the lens, but also save the time for manual assembling.

2. The zooming lens of the present invention comprises two sets of lenses, which only requires a simpler interlock mechanism where two sets of lenses can move simultaneously. Moreover, reduced number of lenses means reduced number of equipment parts, so production cost can be lowered.

3. The lens number in the first set of lenses and the second set of lenses meet a symmetry principle so the aberration of the lens will be significantly improved.

4. In the zooming lens of present invention, the first set of lenses can be used to form image too. Therefore, aberration or shifting formed images can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A zooming lens, suitable for projecting images produced by a display device onto a screen, the zooming lens comprising:

a first set of lenses, sequentially comprising a first lens, a second lens, a third lens and a fourth lens, wherein the fourth lens is adjacent to a side of the display device, wherein optical focusing values of the first lens, the second lens, the third lens and the fourth lens are a positive value, a negative value, a negative value and a positive value, respectively; and a second set of lenses, disposed in an optical path between the first set of lenses and the display device, wherein the second set of lenses comprises a fifth lens, a sixth lens, a seventh lens and a composite lens, wherein the composite lens is at one side of the display device, wherein optical focusing values of the fifth lens, the sixth lens, the seventh lens and the composite lens are a positive value, a negative value, a positive value and a positive value, respectively, and the composite lens comprises two lenses.

2. The zooming lens according to claim 1, wherein the first set of lenses has a negative optical diopter $\psi 1$, and the second set of lenses has a positive optical diopter $\psi 2$.

3. The zooming lens according to claim 2, wherein a relationship between the negative optical diopter $\psi 1$ and the positive optical diopter $\psi 2$ is given by: $1.1 \leq |\psi 1/\psi 2| \leq 1.5$.

4. The zooming lens according to claim 1, wherein the first set of lenses and the second set of lenses are adapted to move along an optical path toward or away from the display device.

5. A zooming lens, suitable for projecting images produced by a display device onto a screen, the zooming lens comprising:

a first set of lenses, comprising N1 pieces of lenses, wherein the first set of lenses has a negative diopter $\psi 1$; and a second set of lenses disposed in an optical path between the first set of lenses and the display device, wherein the second set of lenses comprises N2 lenses and the second set of lenses has a positive diopter $\psi 2$, wherein relationships of N1, N2, $\psi 1$ and $\psi 2$ are given by: $1.1 \leq |\psi 1/\psi 2| \leq 1.5$, $N1+N2=9$, and $|N1-N2| \leq 2$.

6. The zooming lens according to claim 5, wherein the first set of lenses and second set of lenses are adapted to move along an optical path toward or away from the display device.

7. The zooming lens according to claim 5, wherein two of the lenses in the second set of lenses constitute a composite lens.

8. A zooming lens, suitable for projecting images produced by a display device onto a screen, the zooming lens comprising:

a first set of lenses comprising N1 pieces of lenses wherein the first set of lenses has a maximum distance d1 for shifting; and a second set of lenses disposed in the optical path between the first set of lenses and the display device, wherein the second set of lenses comprises N2 pieces of lenses and has a maximum distance d2 for shifting, wherein the relationship of N1, N2, d1 and d2 are given by: $|d1-d2| \leq 1.7$ mm, $N1+N2=9$ and $|N1-N2| \leq 2$.

9. The zooming lens according to claim 8, wherein the first set of lenses has a negative diopter $\psi 1$ and the second set of lenses has a positive diopter $\psi 2$.

10. The zooming lens according to claim 9, wherein the relationship between the negative diopter $\psi 1$ and the positive diopter $\psi 2$ meet the condition of $1.1 \leq |\psi 1/\psi 2| \leq 1.5$.

11. The zooming lens according to claim 8, wherein the first set of lenses and the second set of lenses are adapted to move along an optical path toward or away from the display component.

12. The zooming lens as described in claim 8, wherein the first set of lenses comprises a first lens, a second lens, a third lens and a fourth lens sequentially, wherein the fourth lens is at a side of the display device, wherein optical focusing values of the first lens, the second lens, the third lens and the fourth lens are a positive value, a negative value, a negative value and a positive value, respectively.

13. The zooming lens according to claim 8, wherein the second set of lenses comprises a fifth lens, a sixth lens, a seventh lens and a composite lens, wherein the composite lens is at a side of the display device, wherein an optical focusing values of the fifth lens, sixth lens, seventh lens and composite lens takes a positive value, negative value, positive value and a positive value respectively.

14. The zooming lens according to claim 13, wherein the composite lens comprises two lenses.

* * * * *